United States Patent [19]

Hamill et al.

[11] 3,843,784

[45] Oct. 22, 1974

[54] ANTIBIOTICS A201A AND A201B AND PROCESS FOR THE PRODUCTION THEREOF

[75] Inventors: Robert L. Hamill, New Ross; Marvin M. Hoehn, Indianapolis, both of Ind.

[73] Assignee: Eli Lilly and Company, Indianapolis, Ind.

[22] Filed: Oct. 12, 1971

[21] Appl. No.: 188,058

Related U.S. Application Data

[63] Continuation-in-part of Ser. No. 101,377, Dec. 24, 1970, abandoned.

[52] U.S. Cl.............. 424/119, 424/122, 195/80 R
[51] Int. Cl............................................. A61k 21/00
[58] Field of Search ............... 424/119, 122; 195/80

[56] References Cited
UNITED STATES PATENTS 3,314,853  4/1967  Pansy et al........................ 424/122

Primary Examiner—Jerome D. Goldberg
Attorney, Agent, or Firm—Ralph W. Ernsberger; Everet F. Smith

[57] ABSTRACT

Antibiotics A–201A and A–201B, produced by *Streptomyces capreolus* strain NRRL 3817, under aerobic conditions in submerged liquid culture medium, isolated from fermentation broth as antibiotic mixture by partition into immiscible solvent and separated by silica gel chromatography and separately purified from polar organic solvents have, individually or as a mixture, antibacterial and antifungal and antiamoebic activity.

3 Claims, 2 Drawing Figures

ANTIBIOTICS A201A AND A201B AND PROCESS FOR THE PRODUCTION THEREOF

This application is a continuation in part of my co-pending application Ser. No. 101,377 filed Dec. 24, 1970, now abandoned.

BACKGROUND OF THE INVENTION

A great variety of pathogenic microorganisms, such as bacteria, fungi, and amoebae are causative agents in producing diseased states in man, animals, and plants.

Included in this list are such organisms as *Streptococcus faecalis*, a causative agent of sub-acute bacterial endocarditis in man; *Pasteurella multocida*, etiotogically associated with pneumonia in sheep and cattle; *Leuconostoc citrovorum*, a bacterium found on fruit; *Botrytis cinerea*, a fungus affecting chrysanthemums; and *Entamoeba histolytica*, an amoeba etiologically associated with amoebic or tropic dysentery in man.

Although a number of antibiotics have been developed, some of which possess activity against one or more pathogenic organisms, there remains a need for more effective agents to combat the many diseases caused by these organisms in man, animals and plants.

SUMMARY OF THE INVENTION

This invention relates to novel antibiotic agents and to their preparation. More particularly, this invention relates to two novel nitrogenous antibiotics, arbitrarily designated herein as A-201A and A-201B.

The antibiotics of this invention are produced by culturing the organism *Streptomyces capreolus*, strain NRRL 3817, in an aqueous nutrient medium under submerged aerobic fermentation conditions. The antibiotics are isolated from the fermentation broth by partition into a conventional immiscible solvent, such as chloroform, and the mixture is separated by column chromatography over an active adsorbent, such as silica gel, and eluted therefrom with acetone and an acetone:methanol (9:1) mixture, respectively. Purification of A-201A is accomplished by recrystallization from cold acetone. Antibiotic A-201B is an oil at room temperature, and is obtained by concentrating the acetone: methanol (9:1) eluting solvent. The novel antibiotics of this invention, A-201A and A-201B, possess antibacterial, antifungal and antiamoebic activity.

DETAILED DESCRIPTION OF THE INVENTION

The novel antibiotics of this invention are nitrogenous compounds containing no titratable groups. The characterization data detailed below are for antibiotic A-201A as a crystalline substance, and antibiotic A-201B as a liquid substance at room temperature. The antibiotics are conveniently isolated and characterized in these forms.

Antibiotic A-201A is a white crystalline compound melting at about 170°-72°C. when crystallized from acetone. It is very soluble in alcohols, soluble in acetone, chloroform and ethyl acetate. It is insoluble in water, hydrocarbons, and ether.

Electrometric titration of A-201A in 67 percent dimethylformamide showed an initial pH of 7.8, and indicated no titratable groups within the pH range of 3.5 to 13.5.

Microanalysis gives the following approximate percent elemental composition of A-201A: C, 55.20; H, 6.72; N, 10.45; O, 28.05, and the molecular weight based on mass spectral evidence is about 693.

Figure 1:
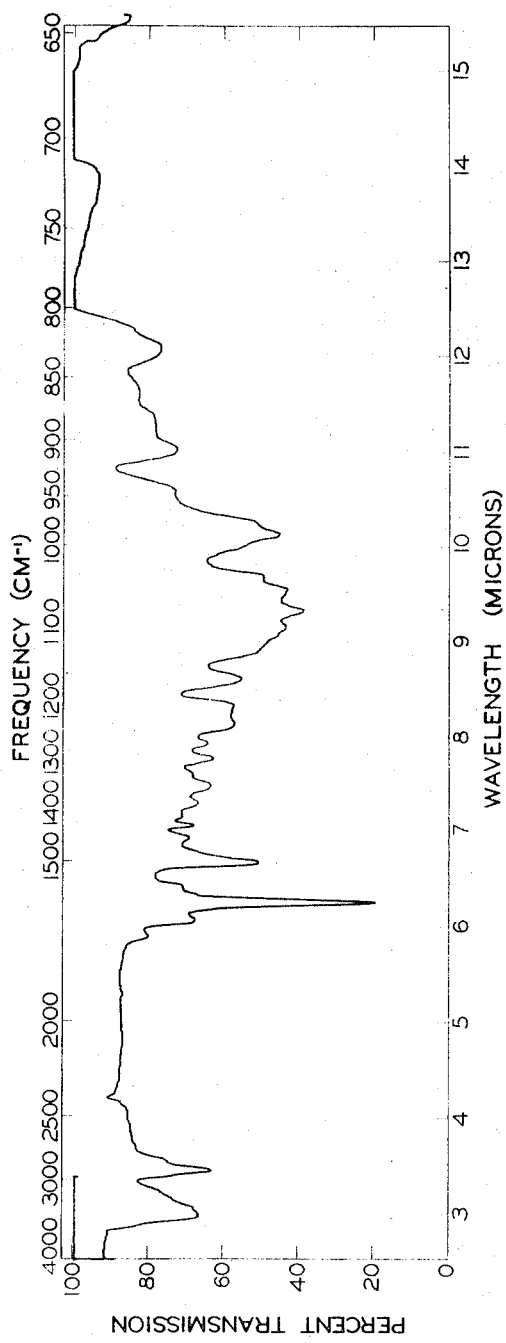

The infrared spectrum of A-201A as a crystalline compound in a chloroform solution is shown in FIG. 1 of the accompanying drawings. The observed distinguishable bands in the infrared absorption spectrum over the range of 2.0 to 15.0 microns are as follows: 2.96 (broad), 3.45, 3.53, 5.89, 6.06, 6.26, 6.33, 6.40, 6.67, 6.92, 7.06, 7.15, 7.28, 7.46, 7.60, 7.76, 7.92, 8.10, 8.30, 8.60, 8.87, 9.06, 9.14, 9.32, 9.54, 9.65, 10.12, 10.23, 10.59, 11.01, 11.30, 11.60, and 12.00 microns.

The ultraviolet absorption spectrum of A-201A in a 95 percent ethanol:water solution shows an absorption maximum at about 208 m$\mu$., with an extinction coefficient, $E_{1\,cm.}^{1\%}$ of 535 and an absorption maximum at about 275 m$\mu$., with an extinction coefficient, $E_{1cm.}^{1\%}$ of 490.

A powder x-ray diffraction pattern of A-201A crystalline compound using vanadium filtered chromium radiation and a wave-length value of 2.2896 Å for calculating the interplanar spacings gives the following values:

| d | I/I. |
|---|---|
| 14.0 | .20 |
| 9.5 | .05 |
| 6.7 | 1.00 |
| 5.0 | .50 |
| 4.5 | .05 |
| 4.2 | .10 |
| 3.8 | .05 |
| 3.5 | .10 |

The behavior of A-201A crystalline compound in paper chromatographic studies is shown by the $R_f$ values listed below. The $R_f$ values were obtained in the indicated solvent systems, using in each instance Whatman No. 1 paper. The location of the antibiotic on the chromatogram was determined by bioautograph using *Sarcina lutea* as the test organism.

| Solvent System | $R_f$ Value[a] |
|---|---|
| 1 | 0.87 |
| 2 | 0.89 |
| 3 | 0.88 |
| 4 | 0.44 |
| 5 | 0.47 |
| 6 | 0.48 |
| 7 | 0.70 |
| 8 | 0.87 |
| 9 | 0.88 |
| 10 | 0.13 |
| 11 | 0.83 |

[a] $R_f$ value is defined as the ratio of the distance traveled by the antibiotic from the origin to the distance traveled by the solvent front from the origin.

Key to the Solvent Systems:
1. Butanol saturated with water
2. Butanol saturated with water plus 2 percent p-toluenesulfonic acid
3. Butanol saturated with water plus 2 percent p-toluenesulfonic acid plus 2 percent piperidine
4. Methylisobutylketone saturated with water
5. Methylisobutylketone saturated with water plus 2 percent p-toluenesulfonic acid 6. Methylisobutylketone saturated with water plus 2 percent piperidine
7. Water:methanol:acetone (12:3:1). This solution is adjusted to pH 10.5 with NH$_4$OH and then lowered to pH 7.5 with H$_3$PO$_4$
8. Eighty percent ethanol with 1.5 percent NaCl. Paper is impregnated with 1M sodium sulfate solution
9. Methanol:0.1 N HCl (3:1)
10. Benzene saturated with water
11. Water:ethanol:acetic acid, (70:24:6).

Thin-layer chromatographs of A-201A crystalline compound developed on silica gel plates (Brinkman silica gel F-254 plates) showed the following $R_f$ values:

| Solvent System | $R_f$ | Detectors |
|---|---|---|
| Ethyl acetate:ethanol (4:1) | 0.49 | (Naphthorescorcinol (reagent, |
| Ethyl acetate:ethanol (1:1) | 0.83 | (H$_2$SO$_4$, UV light, or bioautograph |

The specific rotation of A-201A is $[\alpha]_D^{25} -129.6°$ (C = 1, methanol).

The NMR spectrum of A-201A crystalline compound indicates the presence of 4-5 methyl groups, aromatic bonds, and hydroxyl groups. Acetylated A-201A contains about 21.17 percent acetyl groups, and the NMR spectrum indicates the presence of triacetyl A-201A.

Antibiotic A-201B is a colorless to light brown oil at 25°C. It is soluble in alcohols, acetone, chloroform, and ethyl acetate, and is insoluble in water, hydrocarbons, and ether. It can be conveniently eluted from a silica gel column with an acetone:methanol (9:1) mixture.

Electrometric titration of A-201B in 67 percent dimethylformamide showed an initial pH of 7.3, and indicated no titratable groups within the pH range of 3.5 to 13.5.

Microanalysis gives the following approximate percent elemental composition of A-201B: C, 65.41; H, 9.03; N, 5.76; O, 17.78, and the molecular weight determined by the vapor pressure osmotic method is about 417.

Figure 2:
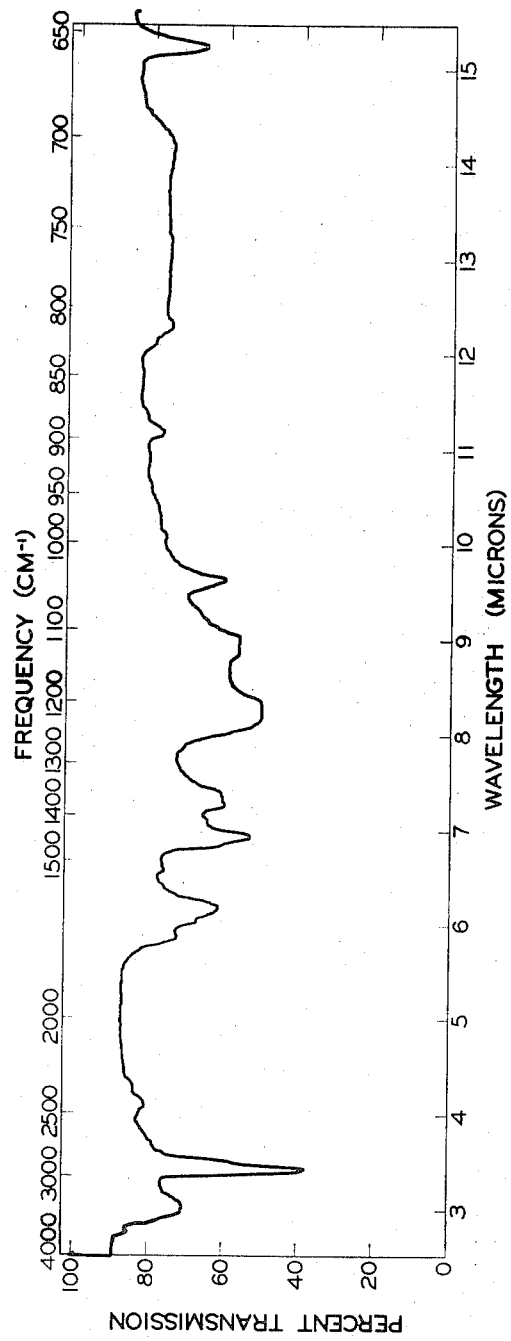

The infrared spectrum of A-201B in a chloroform solution is shown in FIG. 2 of the accompanying drawings. The observed distinguishable bands in the infred absorption spectrum over the range of 2.0 to 16.0 microns are as follows: 2.77, 3.05, 3.45, 3.51, 5.90, 6.05, 6.20, 6.60, 6.86, 6.95, 7.10, 7.30-7.40, 8.30, 8.90-9.00, 9.64, 10.10, 11.20, 12.30, and 15.23 microns.

The ultraviolet absorption spectrum of A-201B in a 95 percent ethanol: water solution shows an absorption maximum at about 222 m$\mu$., with an extinction coefficient, $E_{1cm}^{1\%}$ of 515; an absorption maximum at about 242 m$\mu$., with an extinction coefficient, $E_{1cm}^{1\%}$ of 405; an absorption maximum at about 327 m$\mu$., with an extinction coefficient, $E_{1cm}^{1\%}$ of 150; and, an absorption maximum at about 340 m$\mu$., with an extinction coefficient, $E_{1cm}^{1\%}$ of 225.

The behavior of A-201B in paper chromatographic studies is shown by the $R_f$ values listed below. The $R_f$ values were obtained in the indicated solvent systems using in each instance Whatman No. 1 paper. The location of the antibiotic on the chromatogram was determined by bioautograph using *Sarcina lutea* as the test organism.

| Solvent System | $R_f$ Value [a] |
|---|---|
| 1 | 0.65 |
| 2 | 0.92 |

[a] $R_f$ value same as defined above.

Key to the Solvent System

1. Water saturated with methylisobutyl ketone, plus 2 percent p-toluenesulfonic acid and 1 percent piperidine
2. Eighty percent ethanol with 1.5 percent NaCl. Paper is impregnated with 1M sodium sulfate solution The novel antibiotics of this invention have an inhibitory action against the growth of microbial organisms, both bacteria and fungi, which are pathogenic to animal and plant life and are therefore useful in suppressing the growth of such organisms.

The minimum inhibitory concentration of the novel antibiotics of this invention, expressed in micrograms per milliliter, determined by the tube dilution test, for a number of representative organisms is listed in Table 1, below.

TABLE 1

Activity of Antibiotics A-201A and A-201B

| Test Organism | Minimum Inhibitory Concentration (mcg./ml.) | |
|---|---|---|
| | A-201A | A-201B |
| *Staphylococcus aureus* | 1.56 | 6.25 |
| *Streptococcus faecalis* | 12.50 | 25.00 |
| *Erwinia amylovora* | 12.50 | 25.00 |
| *Botrytis cinerea* | 100.00 | 0.39 |
| *Trichophyton mentagrophytes* | 25.00 | 3.12 |
| *Xanthomonas phaseoli* | 50.00 | 50.00 |
| *Lactobacillus casei* | 12.50 | N.T.[a] |
| *Leuconostoc citrovorum* | 0.20 | N.T. |
| *Vibrio metschnikovii* | 25.00 | N.T. |
| *Mycobacterium avium* | 1.56 | N.T. |
| *Diplococcus pneumoniae* | 6.25 | N.T. |
| *Neisseria meningitidis* | <25.00 | N.T. |
| *Mycoplasma gallisepticum* | 0.78 | N.T. |
| *Pasteurella hemolytica* | 50.00 | N.T. |
| *Pasteurella multocida* | 3.12 | >100.00 |
| *Escherichia coli* | 50.00 | >100.00 |
| *Escherichia insidioa* | 50.00 | N.T. |
| *Salmonella spp.* | 50.00 | >100.00 |
| *Candida tropicalis* | N.T. | 50.00 |
| *Ceratocystis ulmi* | N.T. | 0.39 |
| *Fusarium oxysporium F. lycopersici* | N.T. | 50.00 |
| *Verticillium albo-atrum* | N.T. | 12.50 |

[a] N.T. = not tested.

The A-201A antibiotic has *in vivo* activity against *Mycoplasma gallisepticum* infections in chickens. For example, when 5 mg. of A-201A are injected subcutaneously in the neck of chickens infected with the organism, activity is demonstrated by the reduction in the number of air sac lesions.

When administered orally at a dose of 100 mg./kg., the mixture of A-201 antibiotics is effective in the treatment of young rats infected with *Entamoeba histolytica*.

Also, the A-201 antibiotic mixture is effective at 50 mg./kg., intraperitoneally, in controlling *Borrelia novyi* infections in mice.

Antibiotic A-201A when given by subcutaneous injection to mice has *in vivo* animicrobial activity against infectious organisms; for example: the $ED_{50}$ values (efective dose to protect 50 percent of the test animals) in illustrative infections are as follows when one dose is employed: *Staphylococcus aureus* 6.5 mg./kg.; *Diplococcus pneumoniae*, 100 mg./kg.; *Streptococcus pyogenes* C203, 12 mg./kg. The toxicity of A-201A is: $LD_{50}$ (i.p.) 400 mg./kg. in mice.

Antibiotic A-201A is also effective in inhibiting the growth of microorganisms which contribute to the development of periodontal disease. For example, a solution of A-201A exhibits antimicrobial activity against plaque forming organisms as illustrated in the following test system: Tubes of nutrient broth containing 5 percent sucrose are inoculated with a cariogenic microorganism. Glass rods are immersed in the medium and the tubes are incubated at 37°C. over night after which a layer of plaque (primarily cells and dextran) forms on the surface of the rod. The rods are then transferred to solutions containing varying concentrations of A-201A and allowed to remain in contact with the antibiotic for 5, 10, and 15 minutes. After the appropriate time has elapsed, the rods are rinsed twice with sterile, deionized water, and immersed in uninoculated medium containing 5 percent sucrose. After incubating over night at 37°C. bromthymol blue is added to each medium. Growth is detected by observing the color changes from blue to yellow due to the acid production of the organisms when grown in a sucrose containing medium. Two cariogenic *Streptococci* spp.; namely, A-31036 and A-31037 were employed in the test with A-201A. The growth of both organisms was prevented by A-201A at a 1.0 percent concentration when the solution was in contact with the test rod for 5 minutes.

Moreover, A-201A inhibits the growth of cariogenic microorganisms in a broth dilution test. For example, the following minimum inhibitory concentration (MIC) of A-201A was found for the test organisms described.

| Test Organism | Minimum Inhibitory Concentration (MIC) mcg./ml. |
|---|---|
| *Streptococcus mutans*, NCPC 10449 (National Collection Type Culture, London) | 1.0 |
| *Streptococcus* sp. (unidentified), Strain-A31036 | 2.0 |
| *Streptococcus* sp. (unidentified), Strain-A31037 | 1.5 |
| Filamentous rod, (unidentified), Strain-A31038 | 2.5 |

The incorporation of A-201A into an appropriate toothpaste, gel, powder, or the like, or a suitable mouthwash, or other oral hygiene preparation can provide an effective method for inhibiting the development of dental caries. Alternatively, a solution of A-201A at an appropriate concentration can be applied to the surface of the gums and teeth with a suitable swab.

Antibiotic A-201A has also been found to be effective in promoting growth in animals. When A-201A was added to the basal ration of 4-day old growing chicks at a rate of 45.4 g./ton, the weight gains and the feed efficiencies were shown to be improved over a 10-day period. Chicks getting the A-201A antibiotic along with the basal ration gained 160 g. while those birds eating solely the basal ration gained 148 g. Moreover, the feed efficiencies were improved to the extent that those chicks receiving the A-201A required only 1.38 pounds of feed per pound of weight gained; whereas the birds eating solely the basal ration, required 1.52 pounds of feed for each pound of weight gained.

The novel antibiotics of this invention are produced by culturing an A-201-producing strain of a Streptomycete organism in a suitable culture medium under submerged aerobic conditions until the culture medium contains substantial antibiotic activity. The antibiotics can be recovered by employing various isolation and purification procedures commonly used and understood in the art. The antibiotic-containing culture medium yields an antibiotic mixture comprising the antibiotics A-201A and A-201B. The individual antibiotics can be separated from each other and from other minor components of the fermentation mixture. Antibiotic A-201A can be obtained in crystalline form by chromatography and crystallization. Antibiotic A-201B can be obtained as an oil at room temperature by chromatography.

The actinomycete used according to this invention for the production of the antibiotic mixture has been identified as a strain of *Streptomyces capreolus* Higgens and has been deposited without restriction as to availability with the permanent culture collection of the Northern Utilization Research and Development Laboratory, Agriculture Research Service, United States Department of Agriculture, Peoria, Ill. and has been assigned the accession No. NRRL 3817. The strain was isolated from a soil sample collected in Venezuela. The organism was isolated from the soil sample by suspending portions of the sample in sterile distilled water and streaking the suspension on nutrient agar. The seeded nutrient agar plates were incubated at 25°-35°C. until growth was observed. At the end of the incubation period, colonies of the A-201 producing organisms were transferred by means of a sterile platinum loop to agar slants. The agar slants were then incubated to provide suitable quantities of inoculum for the production of A-201.

The principal morphological characteristics of the A-201 producing strain of *Streptomyces capreolus* used in this invention are as follows: Oval to slightly cylindrical shaped, smooth spores are arranged in long, flexous, interwoven chains, generally numbering from 10-50 spores per chain, with some chains having 50 plus spores per chain. The dimensions of the spores range between 1.005 to 2.01 $\mu$. by 0.67 to 1.005 microns. The spores *en masse* range from white to yellow or red on various media. [Shirling, E. B. and Gottlieb, *Inter Bull. Systemic Bacteriol.*, 16, 313-40 (1966)]. This culture can be placed in the white, yellow and red groups of Tresner and Backus, *Applied Microbiology*, 11 335-8 (1963). Cell-wall analysis based on the procedure of Becker et al., App. *Microbiol.*, 12, 421-3 (1964), indicates the presence of the mesoisomer of diaminopimelic acid. The culture is melanin-negative. The culture is capable of good growth at incubation temperatures of 35°C. or more.

Other Streptomyces spp. similar to A-201 are *Streptomyces alboflavus* and *Streptomyces canescus*. However, *Streptomyces alboflavus* produces a melanin pigment and *Streptomyces canescus* produces globose spores.

The methods employed in the taxonomic sutudies of the A-201 producing strain of *Streptomyces capreolus*, NRRL 3817, are those recommended for the International Streptomyces Project for the characterization of Streptomyces species [Shirling and Gottlieb, *ibid*]. Results of the taxonomic studies are summarized in the paragraphs which follow. Color names were assigned according to the Inter Society Color Council, National Bureau of Standards (ISCC. NBS) method [Kelly, K. L. and Judd, D. B., U.S. Department of Commerce, Circ. 553 (1955)]. The letters in parentheses refer to color blocks and the underlined letters and numbers to color tabs in Tresner and Backus, ibid. The numbers in brackets refer to color blocks in Maerz, A., and Paul, M. R., Dictionary of Color, McGraw-Hill, N.Y. (1950). The ISP numbers refer to the International *Streptomyces* Project media, the composition of which is given in Shirling and Gottlieb, ibid. Observations were made after incubation at 30°C. for 14 days, unless otherwise noted.

MICROSCOPIC MORPHOLOGY, CULTURAL CHARACTERISTICS AND PHYSIOLOGY OF STREPTOMYCES CAPREOLUS NRRL 3817

*Microscopic Morphology* — Spores are oval to slightly cylindrical in shape and are arranged in long, flexous, interwoven chains, numbering from 10–50, or more, spores per chain. The surface of the spores is smooth as observed by the electron microscope. The spore dimensions range from 1.005 to 2.0 $\mu$. by 0.67 to 1.005 microns.

CULTURAL CHARACTERISTICS

Tomato paste-oatmeal agar — Good growth with scant aerial mycelium and spores (W) white *b*. Reverse light grayish yellowish brown [13B5]. No soluble pigment.

Czapek's agar — Good growth with scant aerial mycelium and spores (R) pale orange yellow 3*ca*, [10B3]. Reverse pale yellow [10B2]. No soluble pigment.

Yeast extract agar — Abundant growth, with no aerial mycelium or spores. Reverse strong yellowish pink [2F9]. No soluble pigment.

Bennett's agar — Abundant growth with no aerial mycelium or spores. Reverse moderate red [3H10]. No soluble pigment.

Nutrient agar — Fair growth with no aerial mycelium or spores. Reverse light grayish brown. No soluble pigment.

Emerson's agar — Good growth with no aerial mycelium or spores. Reverse dark grayish yellow [13K3]. No soluble pigment.

Glucose-asparagine agar — Good growth with no aerial mycelium or spores. Reverse strong yellowish pink. No soluble pigment.

Calcium malate agar — Growth on this medium was so poor that no color assignment was made.

Tyrosine agar — Fair growth with scant aerial mycelium and spores (Y) pale yellow 2*db* [11C1]. Reverse pale yellow green [10B1]. No soluble pigment.

ISP medium No. 2 — Abundant growth with no aerial mycelium or spores. Reverse grayish reddish orange [11A8]. No soluble pigment.

ISP medium No. 3 — Fair growth with fair aerial mycelium and spores (R) grayish yellowish pink 5*cb* [4A9]. No soluble pigment.

ISP medium No. 4 — Scant growth with scant aerial mycelium and spores (W) white *b*. Reverse pale yellow green [10B1]. No soluble pigment.

ISP medium No. 5 — Growth on this medium was so poor that no color assignment was made.

PHYSIOLOGICAL CHARACTERISTICS

Gelatin liquidifaction - Negative
Nitrate reduction - Positive
Melanin pigment production -
   *a*. Peptone-yeast extract iron agar - Negative
   *b*. Tryptone-yeast extract broth - Negative

TEMPERATURE REQUIREMENTS

Only vegetative growth is observed between 26°–30°C. At 37°C. good vegetative growth is seen. At 43°–49°C. good vegetative growth and good aerial mycelium are observed. There is no growth at 55°C. Response of Substrate Color to pH Change — Unaffected Table II summarizes the results of the carbon utilization tests carried out on the A-201-producing strain of *Streptomyces capreolus* NRRL 3817. The symbols employed in the table are interpreted as follows:

+ = positive utilization
(+) = probable utilization
(−) = questionable utilization
− = no utilization

TABLE II

Carbon Utilization of *S. capreolus* Strain NRRL 3817

| Carbon Source | Response |
| --- | --- |
| L-arabinose | (−) |
| Cellobiose | + |
| i-inositol | (−) |
| D (+) xylose | + |
| D mannitol | − |
| D (−) fructose | (−) |
| D (+) raffinose | − |
| Sucrose | (−) |
| L (+) rhamnose | − |
| Dextrose | + |
| Control (no carbon) | − |

As previously noted, *Streptomyces capreolus*, strain NRRL 3817, can be grown in a culture medium to produce antibiotics A-201A and A-201B. The culture medium can be any one of a number of different media. However, for economy of production, maximum yield and ease of isolation, certain media are preferred. Generally, a multicomponent medium in which several sources of carbohydrate and nitrogen are available, provides the best growth medium. Carbohydrate is obtained from such sources as dextrins, molasses, glucose, glycerol, and the like. Amino acid mixturres, peptones, and the like are good nitrogen sources. Soybean meal contributes both carbohydrate and nitrogen.

Nutrient inorganic salts are included in the culture media and include the usual salts yielding sodium, potassium, ammonium, calcium, phosphate, sulfate, chloride, bromide, nitrate, carbonate, and like ions. The addition of magnesium and iron salts, preferably as the sulfates, has an especially beneficial effect on the production of the A-201 antibiotic mixture. As is necessary for the growth and development of other microorganisms, essential trace elements should likewise be added to the culture medium for culturing the organism of this invention. Such trace elements are commonly added as impurities incidental to the addition of the other ingredients of the culture medium.

The organism used to produce A–201A and A–201B is capable of growth over a wide pH range. For example, the pH of the various media which can be utilized to culture the organism can range from pH 6.2 to pH 7.2. As is the case with most of the Streptomycetes, the medium gradually becomes more alkaline and can attain a pH of from about pH 6.5 to pH 8.0 during the growth period. However, the pH at the time of harvest at the end of the growth period is usually about pH 6.8 to pH 7.2.

Preferably, submerged aerobic fermentation in large deep tanks is used for the production of large amounts of the A–201 antibiotic mixture. Small quantities of the antibiotics can be obtained by shake flask culture. In the production of this antibiotic mixture it is preferable to use a vegetative inoculum because there is a time lag associated with the inoculation of large tanks with the spore form of the organism. The vegetative inoculum is then transferred to the larger tank. The medium used for the growth of the vegetative inoculum can be the same as that employed for large fermentations, but other media can also be employed.

The A–201-producing organism can be grown at temperatures between 30°C. and 50°C. Production of the highest yields of the antibiotics appears to occur at a temperature between 35°C. and 40°C.

The production of antibiotic activity during the fermentation can be followed by testing the fermentation broth for antibiotic activity against organisms known to be sensitive to the antibiotic. One such assay organism useful in this invention is *Bacillus subtilis*. The bio-assay can be carried out by the paper disc assay or agar plates.

Sterile air is passed through the culture medium to obtain more efficient growth of the organism and increased antibiotic production. The volume of air pumped through the culture medium per minute is usually at least 10.0 percent the volume of the culture medium. Generally, the greater the volume of air forced through the culture medium, up to that amount which produces surging agitation, the more efficient the growth and higher the antibiotic production. Commonly, the maximum production of antibiotic activity is achieved within about 72–120 hours.

The A–201 antibiotics can be recovered from the culture medium and separated from other substances which may be present by filtration, extraction and adsorption procedures. The fluid containing the antibiotic activity is separated from the growth medium by filtration. The solid mycelium is discarded. A common filter aid is usually employed in this operation. The A–201A and A–201B antibiotics are extracted from the filtrate into a conventional immiscible solvent. The partition of the antibiotic mixture into the solvent is preceded by an adjustment of the pH of the filtrate to about pH 8.5 with a 5 N solution of sodium hydroxide. After extraction, the crude A–201 antibiotic mixture is recovered by evaporating the solvent under vacuum, leaving a dry residue which in turn is dissolved in methanol. The solution in methanol is incomplete, and the undissolved material is filtered off and discarded. The resulting methanol solution is reduced to dryness under vacuum, and the dried residue so obtained is dissolved in chloroform. This solution is added to 5 volumes of petroleum ether, and a precipitate forms which contains the antibiotic activity. The precipitated crude A–201A and A–201B antibiotic mixture is filtered off and taken to dryness under vacuum.

The A–201A and A–201B antibiotic mixture can be separated and isolated as individual substances. The mixture of antibiotics is dissolved in 10 volumes of chloroform and chromatographed over a column packed with silica gel (Grace 62, Davison Chemical Company), and thereby separated into antibiotics A–201A and A–201B in essentially pure form. Alternatively, the antibiotic mixture can be chromatographed over a column packed with such chromatographic material as activated alumina, activated carbon, and the like, to obtain the separated individual antibiotics in essentially pure form. Antibiotic A–201A, is obtained from the chromatographic procedure, is further purified by recrystallization from an appropriate solvent. Antibiotic A–201B is a liquid at room temperature as obtained from the chromatographic procedure.

The chromatographic procedure for the separation of the antibiotic mixture into its individual components is described more fully below.

The crude antibiotic mixture obtained as the precipitate from the petroleum ether-cloroform partition is taken to dryness under vacuum, dissolved in acetone, and added to the top of a column packed with silica gel such as that sold under the trade name of Grace 62 (Davison Chemical Co.). The column is packed by slurrying the silica gel in a 1:1 solution of chloroform-acetone and allowing the silica gel to seek its own level as the vehicle is drained away. After the packing settles the column is washed with 3 volumes of the 1:1 chloroform-acetone solution. After the chloroform solution of the antibiotic mixture is applied to the column, the column is again washed with 1 volume of a 1:1 solution of chloroform-acetone, and the A–201A antibiotic eluted with acetone. The eluate is taken off the column in increments and tested for antibiotic activity. The fractions which contain antibiotic activity are combined and evaporated to dryness under vacuum. The residue is taken up in warm acetone, the solution filtered, and the filtrate chilled to −20°C. for 8 hours. The precipitate which forms in the cold acetone solution is antibiotic A–201A. The crystals are removed by filtration and dried under vacuum. The silica gel column from which all of the antibiotic A–201A activity has been removed by elution with acetone is subjected to elution with a 9:1 acetone-methanol solution. The eluate is gathered incrementally and tested for antibiotic activity. The fractions showing antibiotic activity are combined and evaporated to dryness. The residue is a liquid which in turn is washed with acetone and again evaporated to dryness. The solvent-free liquid is antibiotic A–201B, a colorless to light brown oily material.

As previously described, the A–201 antibiotic mixture is active against PPLO organisms and various species of Pasteurella, Salmonella, Streptococci, Staphylococci, and the like, and has inhibitory activity against a variety of plant pathogens. Accordingly, the purified antibiotic A–201A can be used in any suitable composition commonly employed for the treatment of infected animals or plants. For example, A–201A can be injected as a solution into swine infected with Pasteurella spp. on added to the animal's feed or water supply to treat the infection. Antibiotic A–201B, as shown hereinbefore, has antibacterial activity and can be used to treat and control such pathogens as *Erwinia amylovora* (Fire Blight of Pear) by adding the A-201B to conventional foliar spray compositions commonly applied to pear trees for the treatment and control of the bacterium. Moreover, A–201B has antifungal activity and can be used to control fungi, such as *Botrytis cinerea* a pathogen which infects a variety of ornamental and crop plants.

This invention is further illustrated by the following examples:

EXAMPLE 1

SHAKE FLASK FERMENTION OF ANTIBIOTIC A–201

Spores of Streptomyces capreolus, NRRL 3817, were inoculated on a nutrient agar slant having the following composition:

Yeast Extract Agar

| Ingredient | Amount |
|---|---|
| Glucose | 5 g. |
| Yeast extract | 10 g. |
| Agar | 20 g. |
| Water, distilled | 1 l. |

The slant was inoculated with the spores of NRRL 3817 and incubated for 6 days at 30°C. The mature slant cultures were then covered with sterile distilled water and scraped with a sterile loop to loosen the spores. The resulting spore suspension was agitated vigorously to produce a uniform distribution and 1 ml. of the suspension was used to inoculate 100 ml. of a vegetative growth medium having the following composition:

Vegetative Inoculum Medium

| Ingredient | Amount |
|---|---|
| Dextrose | 15 g. |
| Soybean meal | 15 g. |
| Cornsteep solid | 5 g. |
| $CaCO_3$ | 2 g. |
| NaCl | 5 g. |
| Water, tap | 1 l. |

The vegetative growth medium was sterilized by autoclaving at 120°C. for 30 minutes before inoculation.

The inoculated vegetative medium was grown for 48 hours at 30°C. with continuous shaking on a rotary shaker operating at 250 rpm.

One-hundred milliliter portions of a production medium having the same composition as that detailed above for the vegetative inoculum were placed in 500 ml. Erlenmeyer flasks and sterilized at 120°C. for 30 minutes. When cool, the flasks were inoculated with 5 ml. portions of the incubated vegetative medium grown as described in the paragraph above.

The production culture fermentation was shaken for 72 hours at 30°C. on a rotary shaker operating at 250 rpm. The pH of the uninoculated medium was approximately 7.0. The pH gradually increased during the period of fermentation and at harvest was about 7.5. The antibiotic activity was extracted from the fermentation broth by procedures well known in the art.

EXAMPLE 2

A. TWO-HUNDRED AND FIFTY GALLON-TANK FERMENTATION OF A-201 ANTIBIOTICS

Spores of *Streptomyces capreolus*, NRRL 3817, were inoculated on a nutrient agar slant having the following composition:

| Ingredient | Amount |
|---|---|
| Glucose | 5 g. |
| Yeast extract | 10 g. |
| Agar | 20 g. |
| Water, distilled q.s. | 1 l. |

The inoculated slant was incubated at about 30°C. for about 5 days, and then a small amount of sterile distilled water was added and the surface of the agar scraped gently with a sterile platinum wire loop to loosen the organisms and obtain an aqueous suspension.

One-half ml. of the suspension so obtained was used to inoculate 50 ml. of a sterile vegetative growth medium having the following composition:

| Ingredient | Amount |
|---|---|
| Dextrose | 15 g. |
| Bactopeptone | 10 g. |
| Glycerol | 10 g. |
| Amber ALB[1/] | 10 g. |
| Blackstrap Molasses | 5 g. |
| Nadrisol[2/] | 10 g. |
| Water, distilled q.s. | 1 l. |

[1/] Amber ALB is a tradename designation for a milk-albumin product of Amber Laboratories, Juneau, Wisconsin 55039.

[2/] Nadrisol is a tradename designation for a corn distiller's dried solubles product of National Distillers Products Company, New York.

The pH of this growth medium was adjusted to 7.0–7.2 with 5 N sodium hydroxide before sterilization. The pH of the medium was 6.5–6.6 after sterilization. This inoculated vegetative growth medium was grown for 72 hours at about 30°C. with constant agitation on a rotary shaker operating at 250 rpm.

A 20 milliliter portion of the thus-prepared vegetative inoculum was inoculated into 400 ml. of a second stage vegetative growth medium of the same composition as given above. This second stage inoculum was grown for about 48 hours at 30°C., with constant agitation on a rotary shaker operating at 250 rpm.

Forty-two liters of a seed-bump medium constituted as detailed above for the first-stage vegetative growth medium; with 0.2 g. of an antifoam agent added per liter of medium, was added to a fermentation tank after sterilization at 120°C. for 30 minutes. About 400 ml. of the second-stage vegetative inoculum was added to the seed-bump medium. The fermentation of the seed-bump growth medium was carried on for about 24 hours at about 30°C. with an agitator stirring at the rate of 135 rpm and an aeration rate of 0.65 cubic feet/minute. After about 24 hours of fermentation, about 8.0 liters of the seed-bump tank culture was used to inoculate 250 gallons of a sterile production medium constituted as follows:

| Ingredient | Percent (w./v.) |
| --- | --- |
| Antifoam agent | 0.02 |
| Dextrose | 5.00 |
| Soybean grits | 1.50 |
| Blackstrap molasses | 0.30 |
| Calcium carbonate | 0.25 |
| Water, distilled q.s. to | 100.0 |

The temperature of the fermenation was maintained at about 30°C. with a stirring rate of about 250 rpm and an aeration rate of 14 cubic feet/minute. The fermentation was carried on for about 48 hours, at which time a sterile solution of 472 kg. of dextrose in 42 liters of water was added. The fermentation was continued about another 48 hours, terminated and the harvest procedures initiated.

B. ISOLATION OF ANTIBIOTIC MIXTURE

Nine hundred liters of fermentation broth obtained as described in A above were filtered with 27 kg. of a commercial filter aid (Hyflo super-cel), and the filtrate was adjusted to pH 8.5 with a 5 N solution of sodium hydroxide. The alkaline filtrate was extracted two times with 0.5 volume of chloroform. The chloroform extracts were combined and evaporated to dryness under vacuum. The resulting residue was dissolved in 2 liters of methanol, and the insoluble particles were filtered off and discarded. The methanol filtrate was evaporated to dryness under vacuum. The resulting residue was dissolved in 470 ml. of chloroform, and added to 10 liters of petroleum ether; in which operation a precipitate was formed. The precipitate was filtered off, then dried under vacuum yielding 82.6 g. of crude antibiotic A-201 mixture.

C. SEPARATION OF A-201 ANTIBIOTIC MIXTURE

Sixty-three grams of the crude antibiotic A-201 mixture, obtained as described under B above, was dissolved in 500 ml. of chloroform. A chromatographic column of the dimensions 7 cm. × 60 cm. was packed with silica gel (Grace 62, Davison Chemical Co.) slurried in a mixture of 1:1 chloroform and acetone. The vehicle was drained away allowing the silica gel to pack to its own level. The chloroform solution of the crude A-201 antibiotic mixture was applied to the top of the column, and the antibiotic solution permitted to pass through the silica gel bed. After the 500 ml. of chloroform had drained from the column, the silica gel bed was washed with 10 liters of a 1:1 chloroform-acetone mixture. The effluent and wash were discarded.

Acetone was then passed through the column and the eluate tested for antibiotic activity. The fractions which contained antibiotic activity were combined and evaporated to dryness under vacuum. About 500 ml. of acetone were added to the thus obtained residue. The solution was warmed and then allowed to sit overnight at −20°C. to permit the crystallization of A-201A antibiotic. The crystals were filtered off and dried under vacuum to yield 13.3 grams of A-201A antibiotic having a melting point of 170°-172°C.

Following the elution of the A-201A antibiotic, an acetone: methanol (9:1) mixture was passed through the column and removed in fractions which were tested for antibiotic activity. All of the eluate fractions which showed antibiotic activity were combined and evaporated to dryness under vacuum to yield about 5 grams of A-201B antibiotic as an off-white to light brown oil at 25°C.

What is claimed is:

1. The antibiotic substance A-201A, a white crystalline compound soluble in alcohols, acetone, chloroform and ethyl acetate and insoluble in water, hydrocarbons, and ether; melting at about 170°-72°C.; having an composition of 55.20 percent carbon, 6.72 percent hydrogen, 10.45 percent nitrogen, and 28.05 percent oxygen; has an apparent molecular weight determined by mass spectroscopy of 693; having an ultraviolet absorption maximum at about 208 m$\mu$., with an extinction coefficient, $E_{1cm.}^{1\%}$ of 535, and an absorption maximum at about 275 m$\mu$., with an extinction coefficient, $E_{1cm.}^{1\%}$ of 490; and having the following distinguishable bands in the infrared absorption spectrum when dissolved in chloroform: 2.96 (broad), 3.45, 3.53, 5.89, 6.06, 6.26, 6.33, 6.40, 6.67, 6.92, 7.06, 7.15, 7.28, 7.46, 7.60, 7.76, 7.92, 8.10, 8.30, 8.60, 8.87, 9.06, 9.14, 9.32, 9.54, 9.65, 10.12, 10.23, 10.59, 11.01, 11.30, 11.60, and 12.00 microns.

2. The antibiotic substance A-201B, an oil at 25°C., soluble in alcohols, acetone, chloroform and ethyl acetate, and insoluble in water, hydrocarbons, and ether; having an composition of 65.41 percent carbon, 9.03 percent hydrogen, 5.76 percent nitrogen, and 17.78 percent oxygen; has an apparent molecular weight determined by the vapor pressure osmotic method of 417; having an ultraviolet absorption maximum at about 222 m$\mu$., with an extinction coefficient, $E_{1cm.}^{1\%}$ of 515, an absorption maximum at about 242 m$\mu$., with an extinction coefficient, $E_{1cm.}^{1\%}$ of 405, an absorption maximum at about 327 m$\mu$., with an extinction of coefficient, $E_{1cm.}^{1\%}$ of 150, and an absorption maximum at about 340 m$\mu$., with an extinction coefficient, $E_{1cm.}^{1\%}$ of 225; and having the following distinguishable bands in the infrared absorption spectrum when dissolved in chloroform: 2.77, 3.05, 3.45, 3.51, 5.90, 6.05, 6.20, 6.60, 6.86, 6.95, 7.10, 7.30, 7.40, 8.30, 8.90, 9.00, 9.64, 10.10, 11.20, 12.30, and 15.23 microns.

3. A method of producing the antibiotic substance A-201A as defined in claim 1 and antibiotic substance A-201B as defined in claim 2 which comprises cultivating the organism *Streptomyces capreolus*, strain NRRL 3817, in a liquid culture medium containing assimilable sources of carbon, nitrogen and inorganic salts, under submerged aerobic conditions until a substantial amount of antibiotic activity is imparted by said organism to said culture medium, and separating said antibiotic activity therefrom.

* * * * *